UNITED STATES PATENT OFFICE.

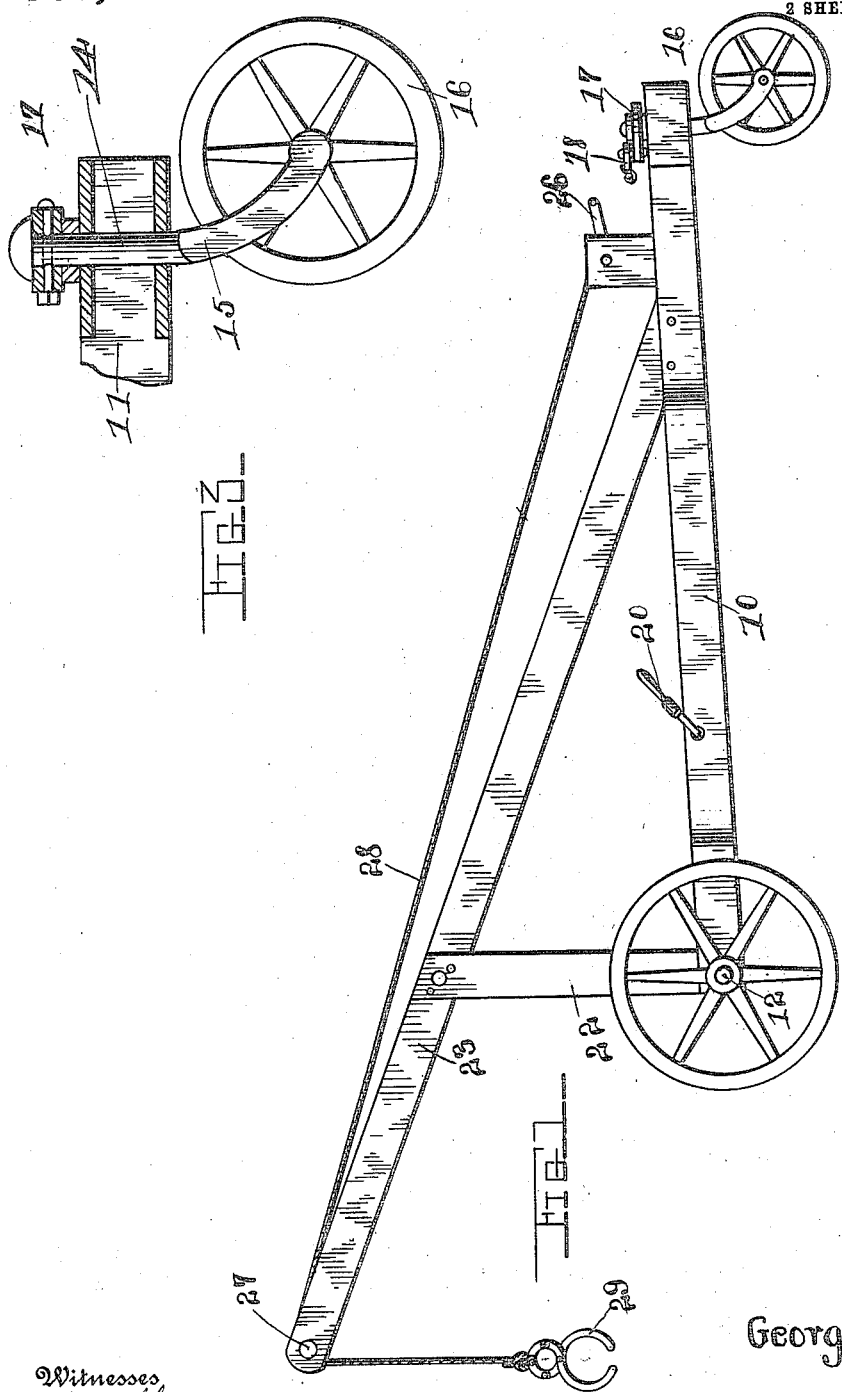

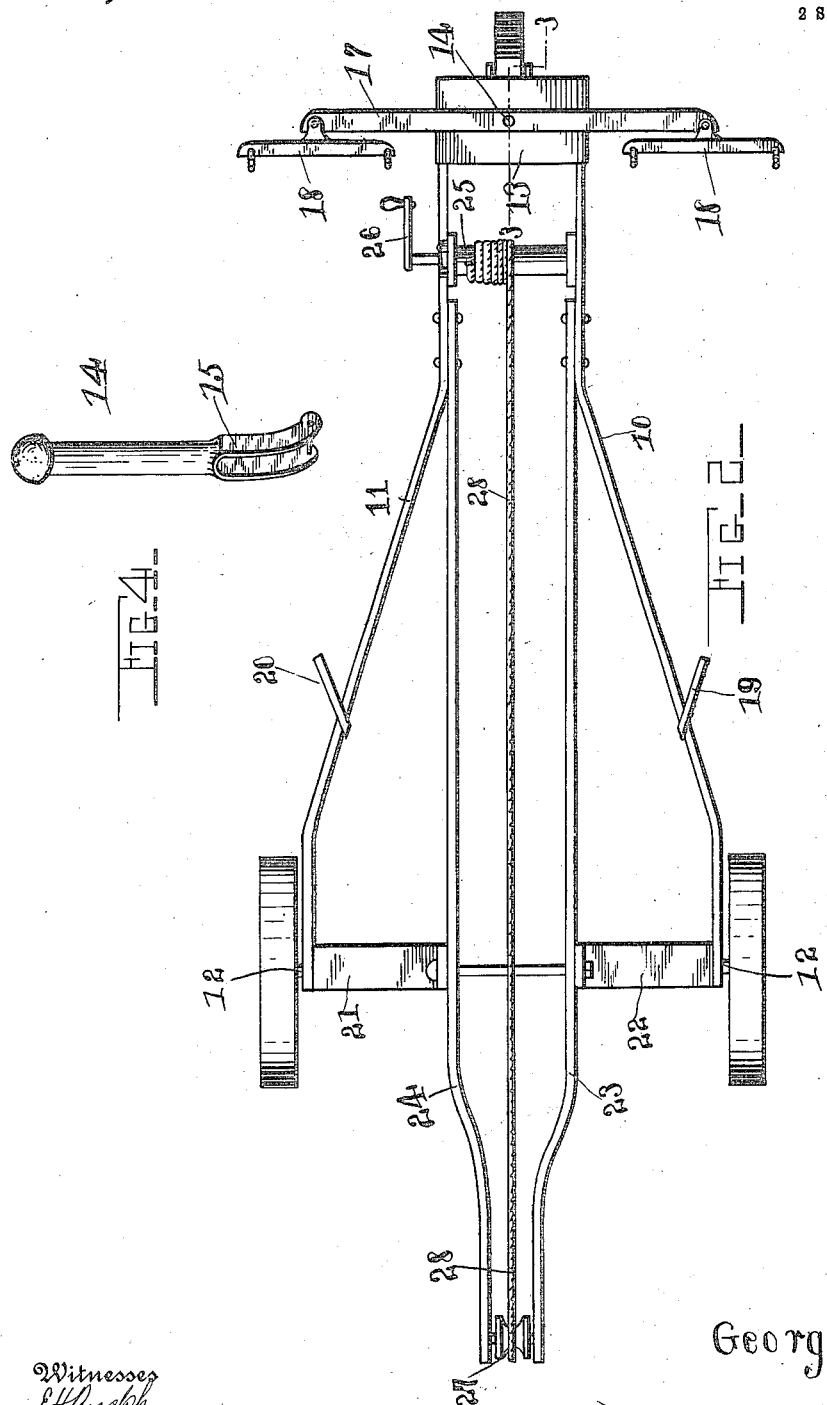

GEORGE VOLLERS, OF GUIDE ROCK, NEBRASKA.

SHOCK-LOADER.

985,645.

Specification of Letters Patent.  Patented Feb. 28, 1911.

Application filed September 9, 1910. Serial No. 581,246.

*To all whom it may concern:*

Be it known that I, GEORGE VOLLERS, a citizen of the United States, residing at Guide Rock, in the county of Webster, State of Nebraska, have invented certain new and useful Improvements in Shock-Loaders; and I do hereby declare the following to be a full, clear, and exact description of the invention, such as will enable others skilled in the art to which it appertains to make and use the same.

This invention relates to shock loaders.

The object of the invention resides in the provision of a machine to be used in the field for lifting shocks of corn, fodder, or the like from the ground and placing the same upon a suitable stack or upon a vehicle for facilitating transportation thereof from one point to another, as may be desired.

A further object of the invention resides in so constructing the device that the same may be guided with great ease from one place to another.

With the above and other objects in view, the invention consists in the details of construction and in the arrangement and combination of parts to be hereinafter more fully described and particularly pointed out in the claims.

In describing the invention in detail, reference will be had to the accompanying drawings wherein like characters of reference denote corresponding parts in the several views; and in which, Figure 1 is a side elevation of a shock loader constructed in accordance with the invention; Fig. 2, a plan view of the same; Fig. 3, an enlarged section on the line 3—3 of Fig. 2; and Fig. 4, a detail perspective view of the vertical shaft in which the rear supporting wheel of the loader is journaled.

Referring to the drawing, the invention is shown as comprising in the main a frame which includes a pair of side members 10 and 11 which are supported at their forward ends by a wheeled axle 12. The side members 10 and 11 converge rearwardly and have their rear ends secured respectively to the sides of a rectangular frame 13 which is disposed transversely of the side members 10 and 11. Journaled in the top and bottom of the frame 13 is a vertical shaft 14, the lower end of which is forked as at 15. Rotatably mounted between the arms of the forked end 15 is a wheel 16 which supports the rear ends of the side members 10 and 11. Fixed on the upper end of the shaft 14 is a doubletree 17, and to each end of the latter is secured a swingletree 18 for attachment of a draft animal to the machine. The side members 10 and 11 have each secured thereto at corresponding points connections 19 and 20 respectively, to which is adapted to be attached the yoke strap of the draft animals in order to keep the latter from pulling too far away from the machine. Supported at each end of the axle 12 are upwardly extending bars 21 and 22 respectively, to which are in turn secured respectively the members 23 and 24 of an upwardly inclined arm. The rear ends of the members 23 and 24 are connected to the side members 10 and 11 respectively. Supported upon the side members 10 and 11 just rearward of their connection with the members 23 and 24 is a drum 25 actuated by a crank 26. A pulley 27 is journaled between the free ends of the members 23 and 24 and a flexible connection 28 winding and unwinding on the drum 25 travels over the pulley 27 and has secured to its free end shock securing means 29.

When in use it will be apparent that in order to properly guide the machine it will only be necessary to cause one of the draft animals to pull forwardly of the other when the wheel 16 will be shifted as result of the rotation of the shaft 14 under the influence of the movement of the doubletree 17.

What is claimed is:—

1. In a shock loader, the combination of a frame, a wheeled axle supporting said frame at its forward end, a vertical shaft journaled in said frame at the rear end of the latter, a wheel rotatably mounted on the lower end of said shaft and supporting the rear end of the frame, a doubletree fixed to the upper end of said shaft and extending on opposite sides of the frame, a swingletree connected to each end of said doubletree, an arm mounted on said frame and inclined upwardly from the rear end to the forward end thereof, a pulley mounted on the free end of said arm, a drum mounted on said frame, and a flexible connection winding and unwinding on said drum and traveling over said pulley, said connection being provided at its free end with shock securing means.

2. In a shock loader, the combination of a frame, a wheeled axle supporting said frame at its forward end, a vertical shaft journaled in said frame at the rear end of the latter and having a forked lower end, a wheel journaled between the arms of said forked end of the shaft and supporting the rear end of the frame, a doubletree fixed to the upper end of said shaft and extending on opposite sides of the frame, a swingletree connected to each end of said doubletree, an arm mounted on said frame and inclined upwardly from the rear end to the forward end thereof, a pulley mounted on the free end of said arm, a drum mounted on said frame, and a flexible connection winding and unwinding on said drum and traveling over said pulley, said connection being provided at its free end with shock securing means.

3. In a shock loader, the combination of a pair of side members, a wheeled axle supporting said side members at their forward ends, a rectangular frame having opposite sides thereof connected to the rear ends of said side members respectively, a vertical shaft journaled in the top and bottom of said frames respectively, a wheel rotatably mounted on the lower end of said shaft, a doubletree fixed to the upper end of said shaft and extending on opposite sides of the frame, a swingletree connected to each end of said doubletree, a forwardly inclined arm supported by said axle and side members, a pulley mounted on the free end of said arm, a drum carried by said side members, and a flexible connection winding and unwinding on said drum and traveling over said pulley, said connection being provided at its free end with shock securing means.

In testimony whereof, I affix my signature, in presence of two witnesses.

GEORGE VOLLERS.

Witnesses:
N. M. DOUDNA,
S. G. SOMERHALDER.